UNITED STATES PATENT OFFICE.

JOSEPH W. WATTLES, OF CANTON, MASSACHUSETTS.

IMPROVEMENT IN TREATING VULCANIZED INDIA-RUBBER THREADS OR CAOUTCHOUC.

Specification forming part of Letters Patent No. 218,842, dated August 26, 1879; application filed February 10, 1879.

*To all whom it may concern:*

Be it known that I, JOSEPH W. WATTLES, of Canton, in the county of Norfolk and State of Massachusetts, have invented a new and useful Improvement in Vulcanized India-Rubber Threads or Caoutchouc, or in treating it especially when in the form of elastic bands, or as threads or strands as employed in the fabrication of elastic webs or suspender-webbing; and I do hereby declare the same to be described as follows.

In carrying out my invention in its application to the elastic vulcanized-rubber strands above mentioned, I cover their surfaces with acetic acid, or I immerse in a bath of acetic acid the mass to be treated, and allow it to remain therein a sufficient time—that is, five minutes or thereabout—after which I remove it from or draw it out of the liquid acid and desiccate it, the said mass.

I have discovered that such application of acetic acid to what is termed "vulcanized rubber" or "caoutchouc" is attended with highly useful results, as it not only renders the rubber stronger or increases its elastic force, or enables it to be stretched farther without breaking, but glazes it or makes it smoother and less liable to chafe or be chafed while in the act or process of being woven in a loom; and, besides, I have good reason to believe that it checks, if not entirely prevents, that subsequent change or atmospheric or chemical action by which the vulcanized rubber in time usually becomes decayed, or loses its elastic property and readily breaks apart on being stretched.

What, therefore, I claim as my invention is as follows—that is to say:

1. India-rubber or caoutchouc vulcanized and subsequently combined with or treated as explained by the acid described.

2. The application of the described acid to the surface of vulcanized india-rubber or caoutchouc for the improvement thereof or the material, as set forth.

JOSEPH W. WATTLES.

Witnesses:
   R. H. EDDY,
   W. W. LUNT.